(12) United States Patent
Li

(10) Patent No.: US 8,359,195 B2
(45) Date of Patent: Jan. 22, 2013

(54) METHOD AND APPARATUS FOR PROCESSING AUDIO AND SPEECH SIGNALS

(75) Inventor: Qi Li, New Providence, NJ (US)

(73) Assignee: Li Creative Technologies, Inc., Florham Park, NJ (US)

(*) Notice: Subject to any disclaimer, the term of this patent is extended or adjusted under 35 U.S.C. 154(b) by 856 days.

(21) Appl. No.: 12/411,634

(22) Filed: Mar. 26, 2009

(65) Prior Publication Data

US 2010/0250242 A1 Sep. 30, 2010

(51) Int. Cl.
*G10L 19/14* (2006.01)
*H03G 5/00* (2006.01)
(52) U.S. Cl. .......................................... 704/205; 381/98
(58) Field of Classification Search .................... None
See application file for complete search history.

(56) References Cited

U.S. PATENT DOCUMENTS

| | | | | |
|---|---|---|---|---|
| 4,536,844 | A * | 8/1985 | Lyon | 607/56 |
| 5,388,182 | A * | 2/1995 | Benedetto et al. | 704/205 |
| 5,528,725 | A * | 6/1996 | Hui | 704/236 |
| 5,732,189 | A * | 3/1998 | Johnston et al. | 704/230 |
| 5,781,881 | A * | 7/1998 | Stegmann | 704/211 |
| 6,009,385 | A * | 12/1999 | Summerfield | 704/203 |
| 6,513,004 | B1 * | 1/2003 | Rigazio et al. | 704/254 |
| 6,675,140 | B1 * | 1/2004 | Irino et al. | 704/203 |
| 6,701,291 | B2 * | 3/2004 | Li et al. | 704/236 |
| 6,745,155 | B1 * | 6/2004 | Andringa et al. | 702/189 |
| 6,748,355 | B1 * | 6/2004 | Miner et al. | 704/203 |
| 6,915,264 | B2 * | 7/2005 | Baumgarte | 704/500 |
| 2005/0065781 | A1 * | 3/2005 | Tell et al. | 704/203 |
| 2010/0016695 | A1 * | 1/2010 | Watson et al. | 600/331 |

OTHER PUBLICATIONS

Daubechies, "A Nonlinear Squeezing of the Continuous Wavelet Transform Based on Auditory Nerve Models", Wavelets in Medicine and Biology, pp. 527-546, 1996.*
Torrence et al., "A Practical Guide to Wavelet Analysis", Bulletin of the American Meteorological Society, Oct. 1997.*
Tan et al., "Applying Wavelet Analysis to Speech Segmentation and Classification", Wavelet Applications, Proc. SPIE2242, 1994.*
Kronland-Martinet, The Wavelet Transform for Analysis, Synthesis, and Processing of Speech and Music Sounds, Computer Music Journal, vol. 12, No. 4, 1988.*
Mantilla-Caeiros et al., "A New Wavelet Function for Audio and Speech Processing", 50th Midwest Symposium on Circuits and Systems, Aug. 2007.*
Yao et al., "Bionic Wavelet Transform: A New Time-Frequency Method Based on an Auditory Model", IEEE Transactions on Biomedical Engineering, vol. 48, No. 8, Aug. 2001.*
Yao et al., "From Otoacoustic Emission Modeling to Bionic Wavelet Transform", Proceedings of the 22nd Annual EMBS international Conference, Jul. 2000.*

(Continued)

*Primary Examiner* — Brian Albertalli
(74) *Attorney, Agent, or Firm* — Ash Tankha; Lipton, Weinberger & Husick

(57) ABSTRACT

A method and device for processing signals representing speech or audio via a plurality of filters that approximate behaviors of the basilar membrane of human cochlea. Each of the plurality of filters is formed from a mother filter via the dilation and a shift in time and has the similar impulse response of the basilar membrane to the frequency band for which the filter represents. Any process can be conducted and any feature can be extracted in the domain of the filters' outputs for applications, such as noise reduction, speech synthesis, coding, and speech and speaker recognition. Processed signals can be synthesized back to the time domain via an inverse cochlear transform.

17 Claims, 13 Drawing Sheets

OTHER PUBLICATIONS

Wassner et al., "New Cepstral Representation Using Wavelet Analysis and Spectral Transformation for Robust Speech Recognition", Proc. of ICSLP-96, 1996.*

Edwards et al., "An Analog Wavelet Transform Chip", IEEE International Conference on Neural Networks, Apr. 1993.*

Irino et al., "Signal Reconstruction from Modified Auditory Wavelet Transform", IEEE Transactions on Signal Processing, vol. 41, Issue 12, Dec. 1993.*

Rioul et al., "Fast Algorithms for Discrete and Continuous Wavelet Transforms", IEEE Transactions on Information Theory, vol. 38, No. 2, Mar. 1992.*

Sahli, "Design and Implementation of teh Cochlear Filter Model Based on a Wavelet Transform as Part of Speech Signals Analysis", Research Journal of Applied Sciences, 2 (4), 2007.*

Krimi et al., "An Improved Psychoacoustic Model for Audio Coding Based on Wavelet Packet", 4th International Conference: Sciences of Electronic, Technologies of Information and Telecommunications, Mar. 2007.*

Salimpour, "Auditory Wavelet Transform Based on Auditory Wavelet Families", Proceedings of the 28th IEEE EMBS Annual International Conference, Aug. 2006.*

Salimpour et al., "Auditory Wavelet Transform", The 3rd European Medical and Biological Engineering Conference, Nov. 2005.*

Darlington, D. J.; Campbell, D.R., "Sub-band adaptive filtering applied to speech enhancement," Spoken Language, 1996, ICSLP 96. Proceedings., 4th Int'l Conf. vol. 2, pp. 921-924 Oct. 1996.

* cited by examiner

METHOD AND APPARATUS FOR PROCESSING AUDIO AND SPEECH SIGNALS

CROSS-REFERENCE TO RELATED APPLICATION

This application is a continuation-in-part application of the co-pending U.S. patent application Ser. No. 11/374,511, entitled "Apparatus and method for noise reduction and speech enhancement with microphones and loudspeakers," filed on Mar. 13, 2006, the entire contents of which are expressly incorporated herein by reference.

FIELD OF THE INVENTION

The present invention is generally directed to a method and apparatus for processing audio and speech signals. In particular, the present invention is directed to a method and apparatus for processing audio signals representing, e.g., human speech, music, and background noise, via a cochlear filter bank that mimics the response of the basilar membrane in the cochlea to pure tones of different frequency bands.

BACKGROUND INFORMATION

Human speeches may be captured as signals representing speech or speech signals using transducers, e.g., microphones, and be further processed for a wide range of applications, e.g., noise reduction or denoising, speech recognition, speaker recognition, speech synthesis, hearing aids, cochlear implants, and speech compression. The speech signals may be captured in the form of analog signals or digital signals and may be stored in electronic media, e.g., memory or disks. The speech signals may be processed using analog or digital processors.

One commonly used scheme in speech signal processing may include transforming speech signals from a time domain representation, e.g., signal waveforms as a function of time, into a frequency domain representation, e.g., spectrums or spectrograms, using the Fourier transformation. However, the Fourier transform may have a fixed time-frequency resolution. Thus, frequency distribution is limited to a linear scale. This limitation may require additional processing, e.g., converting a linear frequency distribution to a non-linear frequency distribution, e.g., as in the basilar membrane. Additionally, the fixed window size of the Fourier transform may cause undesirable harmonics in spectrograms.

This problem may be illustrated by the following example. In most speech processing systems, speech signals are first converted into digital signals on which, for example, short-time Fourier transform via Fast Fourier Transforms (FFT) may be applied for computing spectrograms of the speech signals. The intensity of a spectrogram represents the amplitude of the signal at a particular time and at a particular frequency. FIG. 1 shows speech signals of a male voice recorded under two different scenarios. FIG. 1(A) shows the speech signal recorded using a close-talking microphone, and FIG. 1(B) shows the same speech signal simultaneously recorded using a hands-free microphone in a moving vehicle. The close-talking microphone is placed near the speaker's mouth, while the hands-free microphone is placed, e.g., on a sun visor of the vehicle. Due to the distance between the mouth and the microphone in the hands-free scenario, the recorded speech signal in FIG. 1(B) may include substantial background noise compared to the speech signal as shown in FIG. 1(A). Both speech signals in this example are recorded at a sampling rate of 8 KHz.

FIG. 2 shows the spectrograms of speech signals shown in FIG. 1. Specifically, FIG. 2(A) shows a spectrogram of the clean speech signal recorded using a close-talking microphone as shown in FIG. 1(A), and FIG. 2(B) shows a spectrogram of the noisy speech signal recorded using a hand-free microphone as shown in FIG. 1(B). The spectrograms are computed in the standard way, as in traditional feature extraction for speaker or speech recognition. It may include using a window of, e.g., the length of 30 ms shifted every 10 ms with an overlap of 20 ms, of a type of Hamming window before applying FFT to the speech signals. To facilitate further analysis and feature extraction, the frequency distribution is mapped from linear scales to the Bark scale after the FFT computation.

The spectrograms of FIG. 2 shows two types of distortions: (1) the pitch harmonics as periodical waves along the frequency axis; and (2) the background noise in the frequency domain in the form of "snow" noise (which is different from environmental noise). Both types of distortions are caused by FFT computation.

Additional processing steps may be needed to remove effects of these undesirable distortions. FIG. 3 shows a schematic diagrams of such a Fourier transform based system 300 for extracting features from speech signals. A speech signal may first undergo pre-processing steps of frame blocking 302 and windowing 304. Then at 306 FFT may be applied to the pre-processed speech signal for computing a spectrum. As discussed above, the spectrum may include unwanted harmonics and noise. In this method, triangular filters 308, a non-linear filter 310, and discrete cosine transform (DCT) 312 may be applied to reduce the effects of harmonics and noises caused by FFT. However, while these steps may reduce the harmonic distortions, they may also remove useful and real pitch information. It is commonly known that humans identify peoples' voices by the voice characteristics, represented mainly by pitch information.

Speech signal processing based on wavelet transforms may provide flexible time-frequency resolution. However, it may have other noticeable problems. First, the existing wavelet does not have the capabilities of mimicking the impulse responses of the basilar membrane. Thereby, it may not be used directly for modeling the human hearing system, e.g., cochlea. Second, there is no discrete formula to approximate inverse continuous wavelet transforms even though forward and inverse transforms for continuous wavelet based are well defined.

SUMMARY OF INVENTION

Due to the limitation of FFT computation, the pitch information of human speech has not been fully utilized in speech signal processing, and harmonic distortions may be added in the computation. Thus, there is a need for a speech signal processing method that causes less harmonic distortions and does not require additional computations to rectify harmonic distortions.

One example embodiment of the present invention includes a speech signal processing method or apparatus that takes into account the characteristics of human voice and hearing system to reduce the unwanted harmonic distortions. Referring to FIG. 4, the human hearing system may include an outer (external) ear, a middle ear, and an inner ear. Sound waves may go through the outer ear and push on to the eardrum. The eardrum and three middle ear bones may work together as a mechanical amplifier and transfer the sound waves through movements of the bones. The last bone of the three may be connected to a cochlea, which may be filled with liquid and have a basilar membrane in the middle.

FIG. 5 shows a stretched-out cochlea. The movement of the last bone generates a traveling wave. The traveling wave may have the highest response at the location corresponding to a pure tone at a specific frequency. The frequency distribution on the basilar membrane may be in a nonlinear Bark, ERB (equivalent rectangular bandwidth), or Log scale. The hair cells connected to the basilar membrane may convert the movement of the traveling wave into electrical signals and transmit the signals to the human brain.

In one example embodiment of the present invention, a speech signal may be processed via a filter bank whose response mimics that of a cochlea to a pure tone (called "cochlear transformation" or CT hereafter). The CT may convert speech signals from time domain into a cochlear frequency domain representation. The spectrum of speech signals in the cochlear frequency domain may have much reduced harmonic distortions and noise caused by FFT. The speech signals may be further processed based on the representation in the CT domain. The processed speech signals may then be transformed back to time domain based on an inverse cochlear transform (ICT).

In one example embodiment of the present invention, the CT may model traveling waves on the basilar membrane in the human cochlea. The output from a CT may represent the traveling waves of, e.g., speech signals, on the basilar membrane in decomposed frequency bands. A further ICT may convert the traveling waves back to the original signal. In one example embodiment of the present invention, a discrete-time CT may be formulated for converting digitized speech signals into digital traveling waves. Correspondingly, a discrete-time ICT may be formulated for converting the digital traveling waves back into digitized speech signals.

In one example embodiment of the present invention where a speech signal (or an audio signal, or a music signal) includes background noise, the speech signal may be transformed based on the CT into a number of frequency bands. Noise on each frequency band may then be detected. For example, the energy and spectral patterns of the background noise is commonly different from foreground speech or music signals. Noise may be detected by comparing the spectrum of noise against the spectrum of speech or music. After the detection, a linear or nonlinear threshold, gain, or filter can be applied to the speech signal to reduce or remove components corresponding to noise while keeping or enhancing components corresponding to the speech, music, or audio signals. The processed multi-band signals can be synthesized based on an ICT back to a cleaned signal with improved signal to noise ratio.

In another example embodiment of the present invention in the application field of speech and music synthesis, a speech or music signal may be converted to components within different frequency bands using CT. A plurality of samples of the speech signal within each band may then be removed or replaced based on pre-trained multiple-band models. The processed multi-band signals can be synthesized based on an ICT back to a time domain signal. The synthesized speech signal may include a change (shorter or longer) of speech duration with the effects of, e.g., slower or faster talk than the original speech signal.

In yet another example embodiment of the present invention in the application field of speech or speaker recognition, as shown in FIG. 13, a CT 1302 decomposes a speech (or audio) signal into frequency bands at substantially the same frequency scales as in a basilar membrane. A speech feature extractor may then be used to extract speech features from each frequency band through linear or nonlinear operations. For example, as shown in FIG. 13, for each time instance, the magnitude values computed for each frequency band may be weighted differently so as to achieve equal loudness at 1308, where the loudness may be a quality of sound that is related to its magnitude. A nonlinear processing 1304 may be applied after a CT transform to limit the output of each of the CT bands, $y_i$, to a range, where i is the band number. In one example embodiment, only the positive value for $y_i$ are kept and the negative value are reset to zero. In an alternative example embodiment, the nonlinear processing 1304 may be bypassed. The output of the nonlinear filter may then be used to calculate energy for a spectrogram at 1306. The energy or absolute value may be a windowed average with a window size of 2-4 periods of the central frequency of the specific frequency band or alternatively with windows of a fixed size. Moreover, the windows may have been generated from a sliding window. At 1314, the output of the windowed average energy functionality may be scaled, e.g., by a cubic root operation. After a Discrete Cosine Transform (DCT) 1310, the output of the feature extractor may be a sequence of feature vectors, e.g., cepstrum or delta-cestrum (i.e., temporal derivative of cepstrum), for a speech recognition or speaker recognition engine.

In yet another example embodiment of the present invention in the application field of hearing aid, speech signals may be processed via CT on the hearing aid for sound amplification, noise reduction, equalization, and localization. Each of these functionalities may be implemented in each of the frequency band adapted to the user's need. The processed multi-band signals may be synthesized into one-channel sound signal to a transducer, e.g., a speaker, in the ear.

In yet another example embodiment of the present invention in the application field of audio compression or coding, an audio signal may be decomposed via a CT into different frequency bands. The signal at lower frequency bands may be down-sampled, on which a sub-band coding technique may then be applied for coding or data compression. Encoded signals may also be decoded into the multiple-band signal and then be converted back to signals that are substantially approximate to the original signals by the synthesis.

DETAILED DESCRIPTION OF EXAMPLE EMBODIMENTS

A method for processing signals representing a speech via multiple filters that approximate behaviors of basilar membrane in human cochlea is provided. A first signal representing speech to the multiple filters is provided. The multiple filters filter the first signal. Each of the multiple filters produces one of multiple filtered signals. Each of the multiple filters is formed from a base function via a dilation and a shift in time. An impulse response of the base function at a particular frequency band is similar to an impulse response of the basilar membrane at a corresponding frequency band inside the human cochlea.

In an embodiment, the signal is a digital signal representing speech or audio, the base function is a digital filter representing the impulse response at a point on the basilar membrane to a corresponding frequency, and each of the multiple filters is a digital filter formed from the base function via a dilation and a shift in time. The method further extracts at least one feature from the filtered signal for a speech recognition application. The extracted feature from the filtered signal comprises CT cepstral coefficients.

In another embodiment the signal is an analog signal representing speech or audio, the base function is an analog filter denoting a continuous waveform, and each of the multiple filters is an analog filter formed from the base function via a dilation and shift in time.

In one example embodiment of the present invention, a cochlear transform may be based on a base function that mimics a response of human basilar membrane (BM) in human cochlea to a pure tone. Such a function, $\psi(t) \in L^2(R)$, may be characterized by following conditions: (1) it integrates to zero:

$$\int_{-\infty}^{\infty} \psi(t) dt = 0;$$

(2) it is square integrable with finite energy:

$$\int_{-\infty}^{\infty} |\psi(t)|^2 dt < \infty;$$

Figure 6:
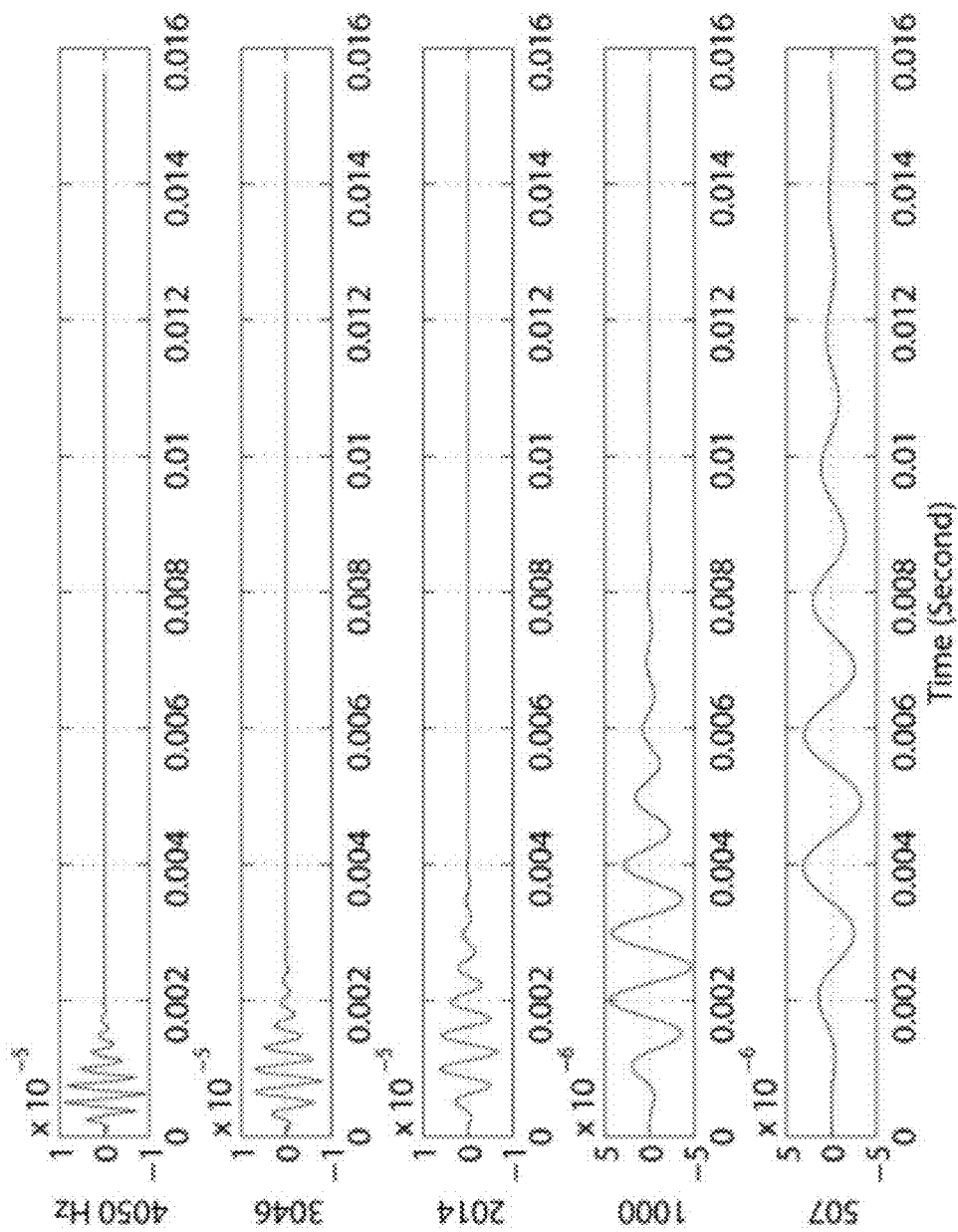
FIG. 6 shows example impulse responses of CT base functions similar to a response of BM to a pure tone according to one example embodiment of the present invention.

(3) it satisfies $$\int_{-\infty}^{\infty} \frac{|\psi(\omega)|^2}{\omega} d\omega = C,$$

where C, $0 < C < \infty$, is a constant; (4) a plot of $\psi(t)$ follows observations of characteristic of BM in psychoacoustic experiments and tapers off to zero on both ends; and (5) the $\psi(t)$ has one major modulation frequency and its frequency response is a triangle-like, band-pass filter centered at the modulation frequency. Conditions (4) and (5) are specifically designed to reflect experimental results from previous psychoacoustic and physiological experiments. FIG. 6 shows example impulse responses of CT base functions similar to a response of BM to a pure tone according to one example embodiment of the present invention.

A cochlear transformation may be constructed from the base function. For a given a square integrable signal, e.g., a speech signal, f(t), a CT may transform f(t) based on the base function $\psi(t)$:

$$T(a, b) = \int_{-\infty}^{\infty} f(t) \frac{1}{\sqrt{|a|}} \psi\left(\frac{t-b}{a}\right) dt$$

where a and b are both real numbers, and both f(t) and $\psi(t)$ are square-integrable (or belong to $L^2(R)$ space), and T(a, b) represents traveling waves in the BM. The $1/\sqrt{|a|}$ is an energy normalization factor that ensures the total energy, or $$\int_{-\infty}^{\infty} \left|\psi\left(\frac{t-b}{a}\right)\right|^2 dt,$$

stays substantially the same for all a and b. The factor a may represent a scale or dilation variable. A change in dilation a may shift the central frequency of the impulse response of $\psi(t)$. The factor b may be a time shift or translation variable. For a given dilation a, the shift b may shift the function $$\psi_{a,b}(t) = \psi\left(\frac{t-b}{a}\right)$$

by an amount b along the time axis. We call $\psi_{a,b}(t)$ the cochlear function or cochlear filter.

Figure 7:
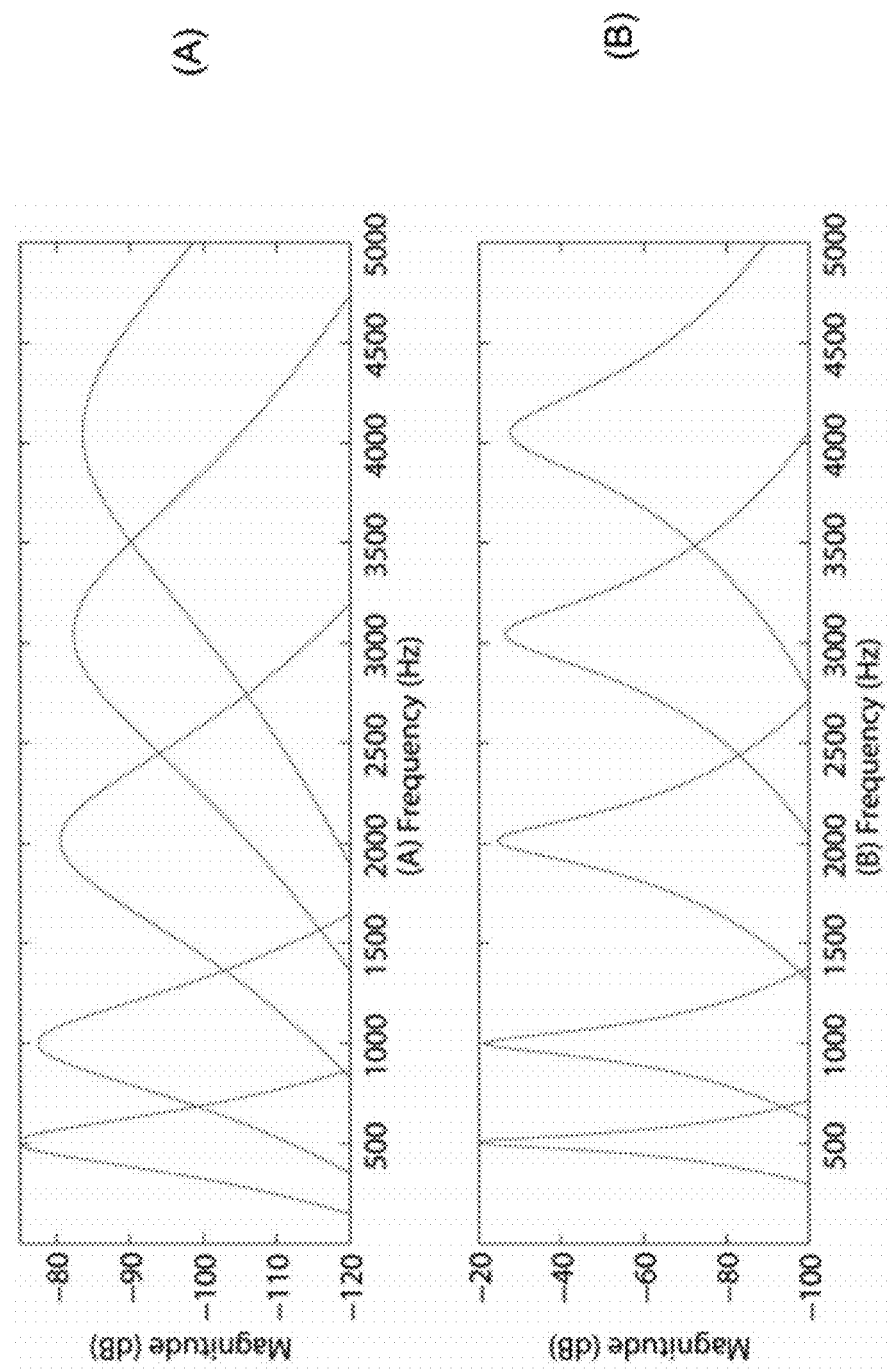
FIGS. 7(A)-(B) show two example cochlear filter banks according to one example embodiment of the present invention.

In one example embodiment of the present invention, the cochlear function may be formulated as $$\psi_{a,b}(t) = \frac{1}{\sqrt{|a|}} \left(\frac{t-b}{a}\right)^\alpha \exp\left[-2\pi f_L \beta\left(\frac{t-b}{a}\right)\right] \cos\left[2\pi f_L\left(\frac{t-b}{a}\right) + \theta\right] u(t)$$

where $\alpha > 0$ of value, e.g., 3, and $\beta > 0$ of value, e.g., 0.035, u(t) is an unit step function, i.e., u(t)=1 for $t \geq 0$ and 0 otherwise. The parameters of $\psi_{a,b}(t)$, e.g., $\theta$, are chosen such that the above-discussed five conditions are satisfied. The value of a may be determined by a central frequency $f_c$ of the current filter and the lowest central frequency $f_L$ in a cochlear filter bank such that $a=f_L/f_c$. For different values of (a, b), $\psi_{a,b}(t)$ may represent different filters within a filter bank. When $0<a\leq 1$, the filter is contracted in scale along the time axis. When $a>1$, the filter is expanded in scale along the time axis. For different values of a, e.g., as, i=1, ..., n, corresponding central frequencies $f_{ci}$ may be pre-computed for each filter. FIG. 7 shows two example filter banks in the frequency domain. FIG. 7(A) shows filters with larger values of $\beta=0.2$ so that each filter is stretched out, while FIG. 7(B) shows filters with smaller values of $\beta=0.035$ so that each filter is narrow. The distribution of cochlear filters in the frequency domain may be according to linear or nonlinear scales, e.g., ERB (equivalent rectangular bandwidth), Bark, log, or any other scales based on the requirements from real world practices.

In one example embodiment of the present invention, a CT may have a corresponding ICT that may transform a time frequency representation, e.g., T(a, b), back to time domain:

$$f(t) = \frac{1}{C} \int_{a=0}^{\infty} \int_{b=0}^{\infty} \frac{1}{|a|^2} T(a,b) \psi_{a,b}(t) da db.$$

In another example embodiment of the present invention, a discrete-time cochlear transform may be applied to digitized signals, e.g., speech signals. For a digitized signal, f[n], n=1, ... N, where N is the length of the signal, the discrete-time cochlear transform is $$T[a_i, b] = \sum_{n=0}^{N} f[n] \frac{1}{\sqrt{|a_i|}} \psi\left[\frac{n-b}{a_i}\right]$$

where $a_i=f_L/f_{c_i}$ is the scaling factor for the ith frequency band with central frequencies $f_{c_i}$. The scaling factor $a_i$ may be linear or nonlinear scales. Similar to continuous cochlear transform, for discrete-time cochlear transform, $a_i$ may be in ERB, Bark, log, or other nonlinear scales.

Correspondingly, discrete-time cochlear transform may have an inverse discrete-time cochlear transform:

$$\overline{f}[n] = \frac{1}{C} \sum_{a_i=a_1}^{a_k} \sum_{b=1}^{N} \frac{1}{|a_i|} T[a_i, b] \psi\left[\frac{n-b}{a_i}\right]$$

where $0 \leq n \leq N$, $a_1 \leq a_i \leq a_k$, and $1 \leq b \leq N$. The $\overline{f}[n]$ is substantially approximate to f[n] when the number of frequency bands is limited.

Fast calculations of the discrete-time cochlear transform and inverse discrete-time cochlear transform may be implemented in manners similar to FFT. In addition, the resolution of lower frequency bands may be reduced to further improve computation speed.

Figure 8:
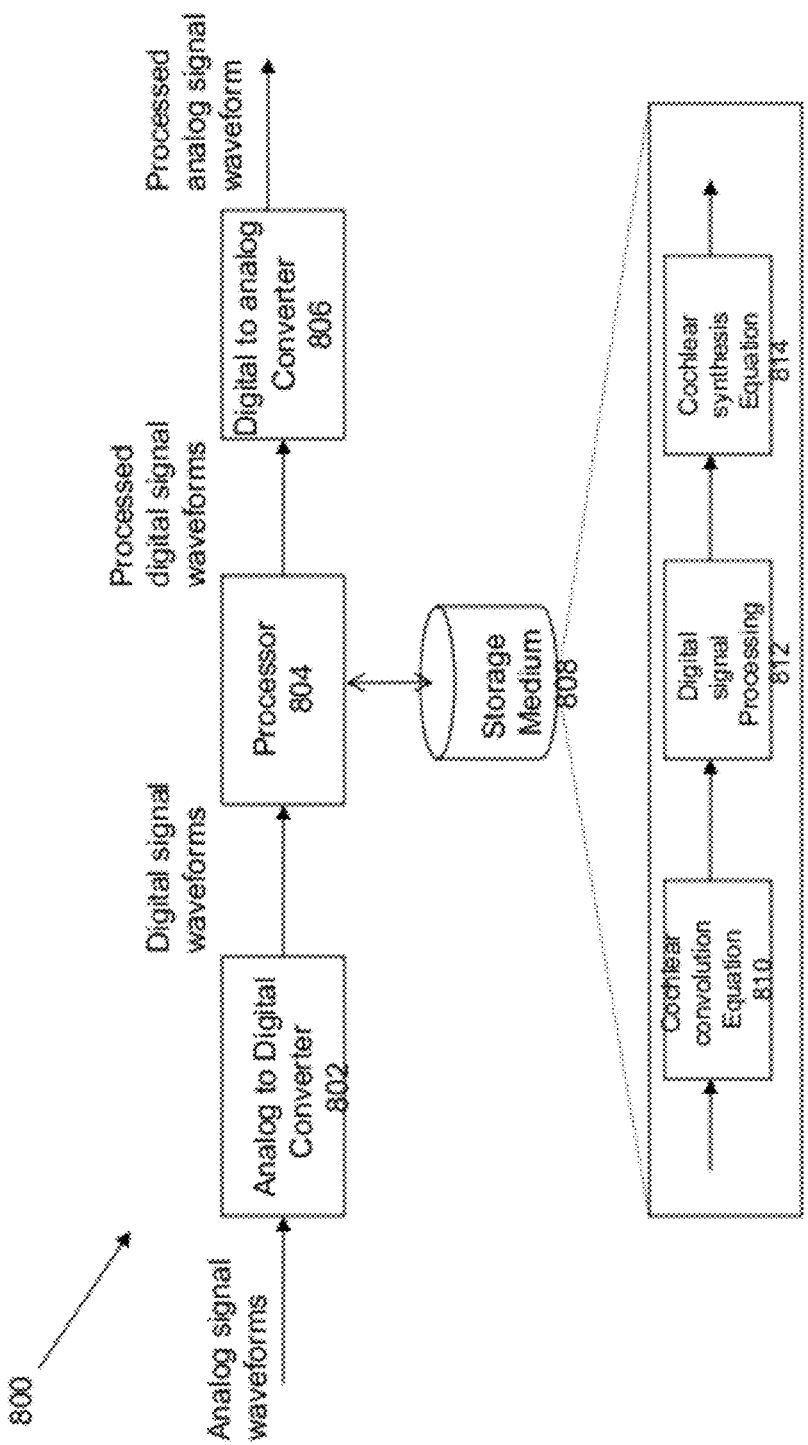
FIG. 8 shows an example speech processing system based on a discrete-time cochlear transform according to one example embodiment of the present invention.

FIG. 8 shows an example speech processing system based on a discrete-time cochlear transform according to one example embodiment of the present invention. Analog signal waveforms, e.g., human speech, may be first provided to an analog to digital converter (ADC) 802 for converting analog signal waveforms into digital signal waveforms. A processor 804, e.g., a DSP, a CPU, or any type of suitable processor, may execute codes that are stored in a storage media 808, e.g., a memory or a hard drive. The execution of the codes stored in the media 808 may perform CT based signal processing methods. According to one example embodiment of the present invention, the digital signal waveforms may first, at 810, convolute with filters in a cochlear filter bank, or in another word, undergo a discrete-time cochlear transform. Then at 812, the digital signal may be further processed based on its frequency domain representation. In one embodiment of the present invention, noise in the speech signal may be removed with filters on different frequency bands. In another embodiment of the present invention, some frames or vectors of the filter bank outputs may be selected and removed to make the speed of speech faster. At 814, an inverse discrete-time cochlear transform may be applied to the output of the digital signal processing unit 812 to produce processed digital signal waveforms. The processed digital signal waveforms may then be converted back to analog signal using a digital to analog converter (DAC) 806. The processed analog signal may be, e.g., cleaned speech or enhance audio signal.

Figure 9:
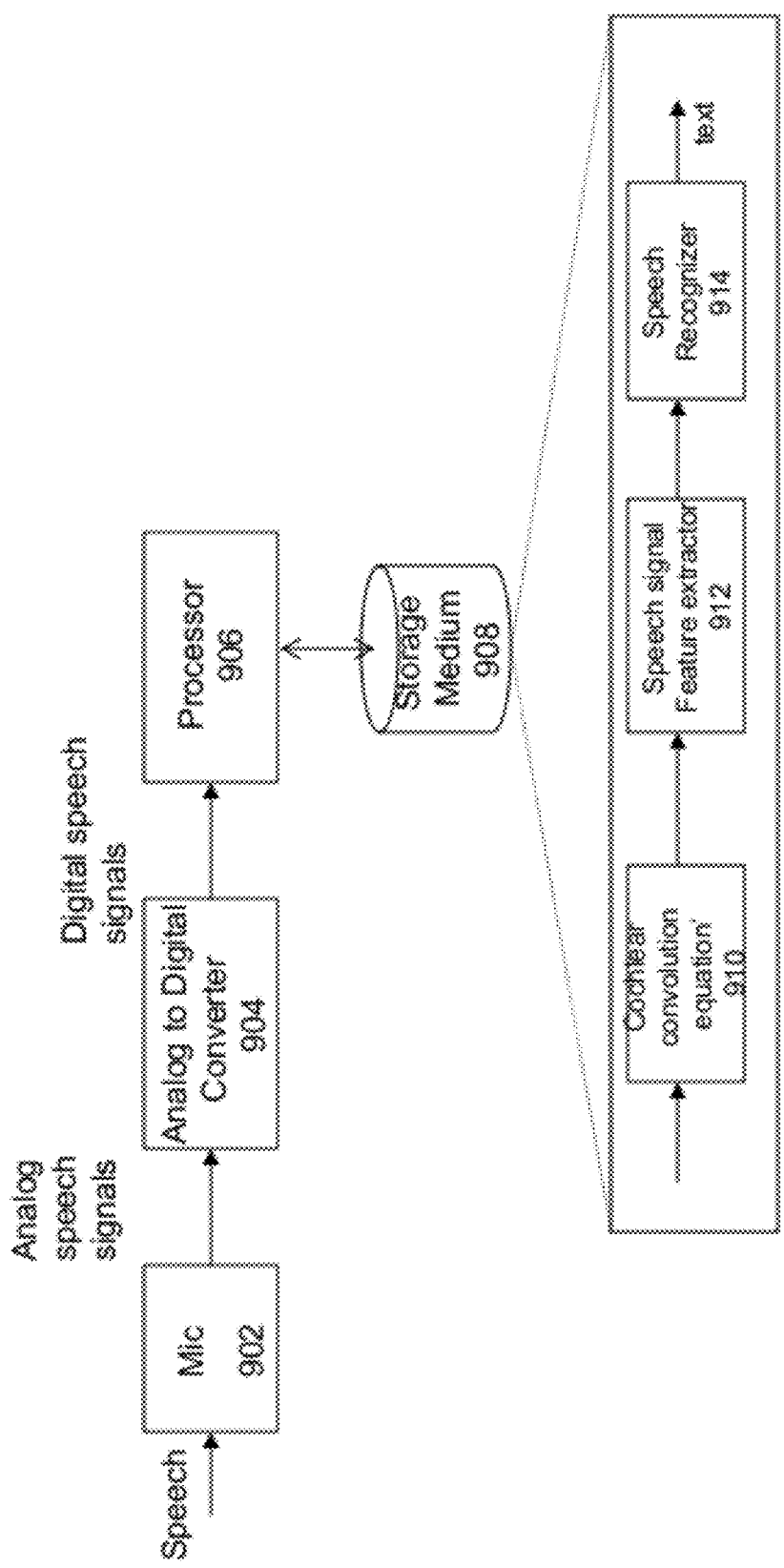
FIG. 9 shows an example speech recognition system based on a discrete-time cochlear transformation according to one example embodiment of the present invention.

FIG. 9 shows an example speech recognition system based on a discrete-time cochlear transformation according to one example embodiment of the present invention.

Figure 13:
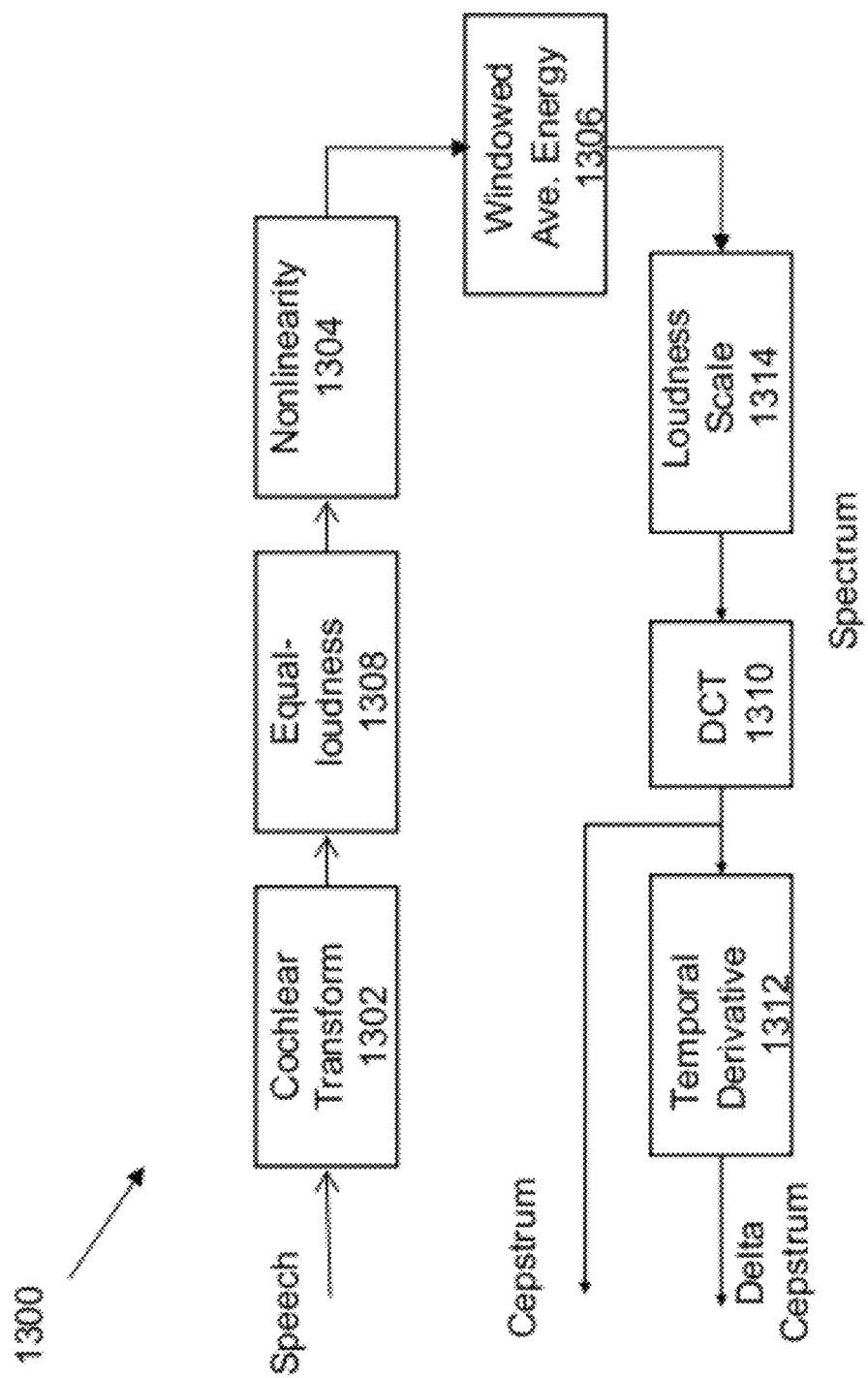
FIG. 13 shows a speech feature extraction system based on the CT according to one example embodiment of the present invention.

Human speech may be recorded using a transducer, e.g., a microphone 902, as analog speech signals. The analog speech signals may then be converted into digital speech signals via a ADC 904. Using the digital speech signals as an input, a processor 906 may execute codes stored in a storage medium 908 to perform following steps. First, a discrete-time cochlear transform 910 may be applied to the digital speech signals via a cochlear filter bank to transform the digital speech signals into a frequency or time-frequency domain representation, e.g., a spectrum or spectrogram of the speech signals. Based on the frequency domain representation, speech features may be extracted at 912 using, e.g., the approach depicted in FIG. 13. Further, a speech recognizer 914 may convert the speech feature frames/vectors into text. The speech recognizer 914 may be any conventional speech recognizer. Alternatively, for speaker recognition applications, the module 914 may be a speaker recognizer that identifies speakers based on speech.

Figure 10:
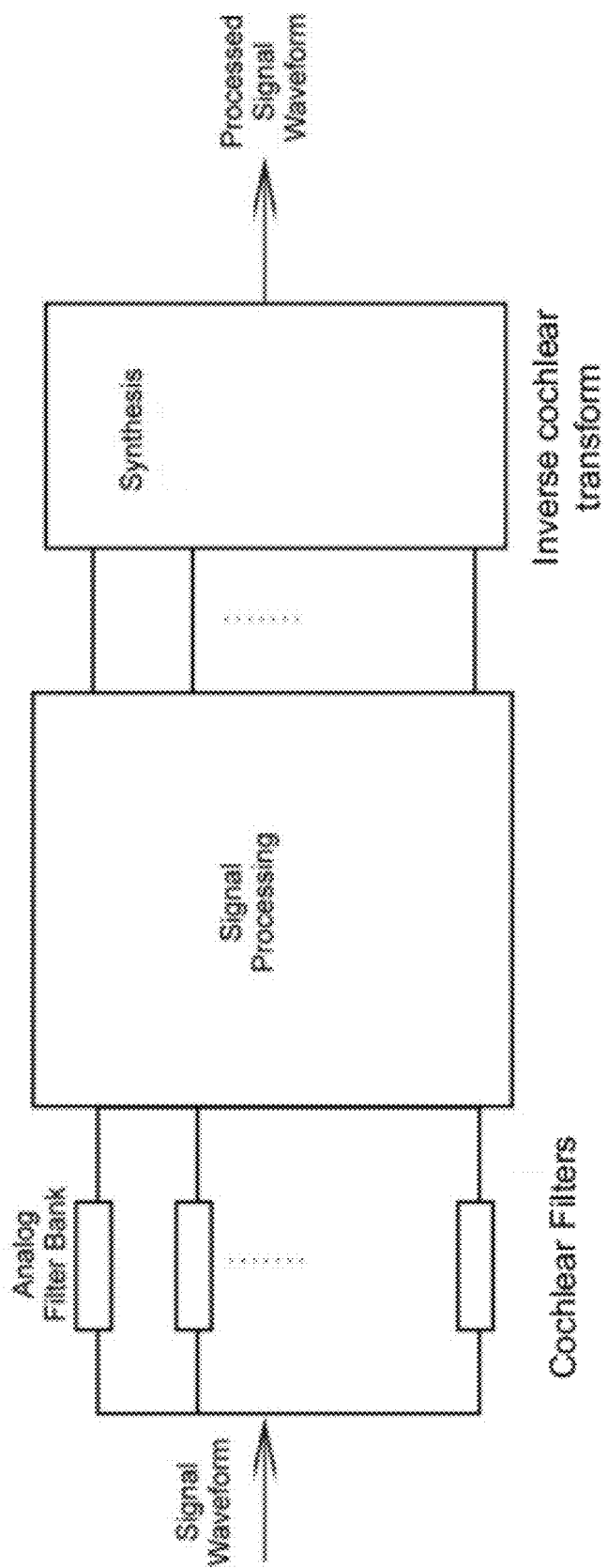
FIG. 10 shows an example signal processing system based on a continuous cochlear transform according to one example embodiment of the present invention.

FIG. 10 shows an example signal processing system based on a continuous cochlear transform according to one example embodiment of the present invention. Analog signals may first be filtered through an analog cochlear filter bank of central frequencies $f_{c_i}$ that may be distributed according to, e.g., Bark scales. The analog cochlear filters may be construct from analog components as known to a skilled artisan. A signal processing unit may then process the decomposed signals at, e.g., different frequency bands. One example of processing may remove or reduce noise according to locations of frequency bands. Another example may involve sub-sampling for a change of the speech characteristics or speed. The processed analog signals may then be synthesized based on an ICT filters bank. Similarly, these synthesizers may be made from analog components.

Figure 1:
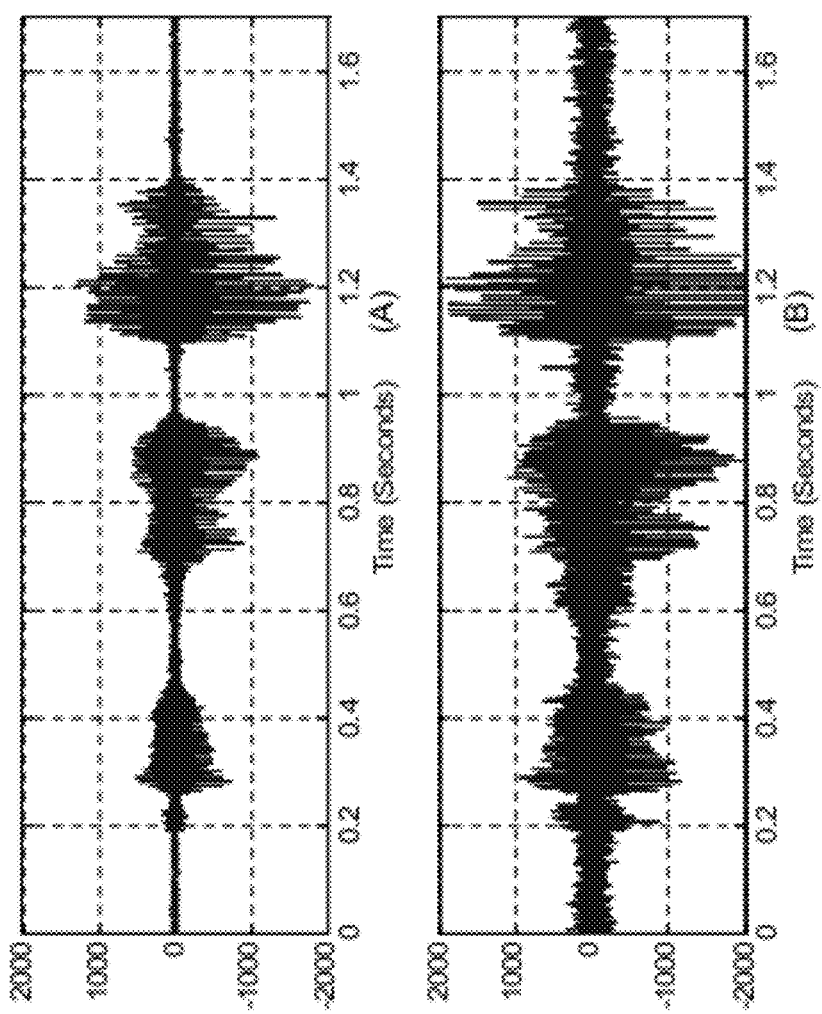
FIGS. 1(A)-(B) show speech signal waveforms of a male voice simultaneously recorded by (A) a close-talking microphone and (B) by a hands-free microphone, in a moving vehicle.
Figure 2:
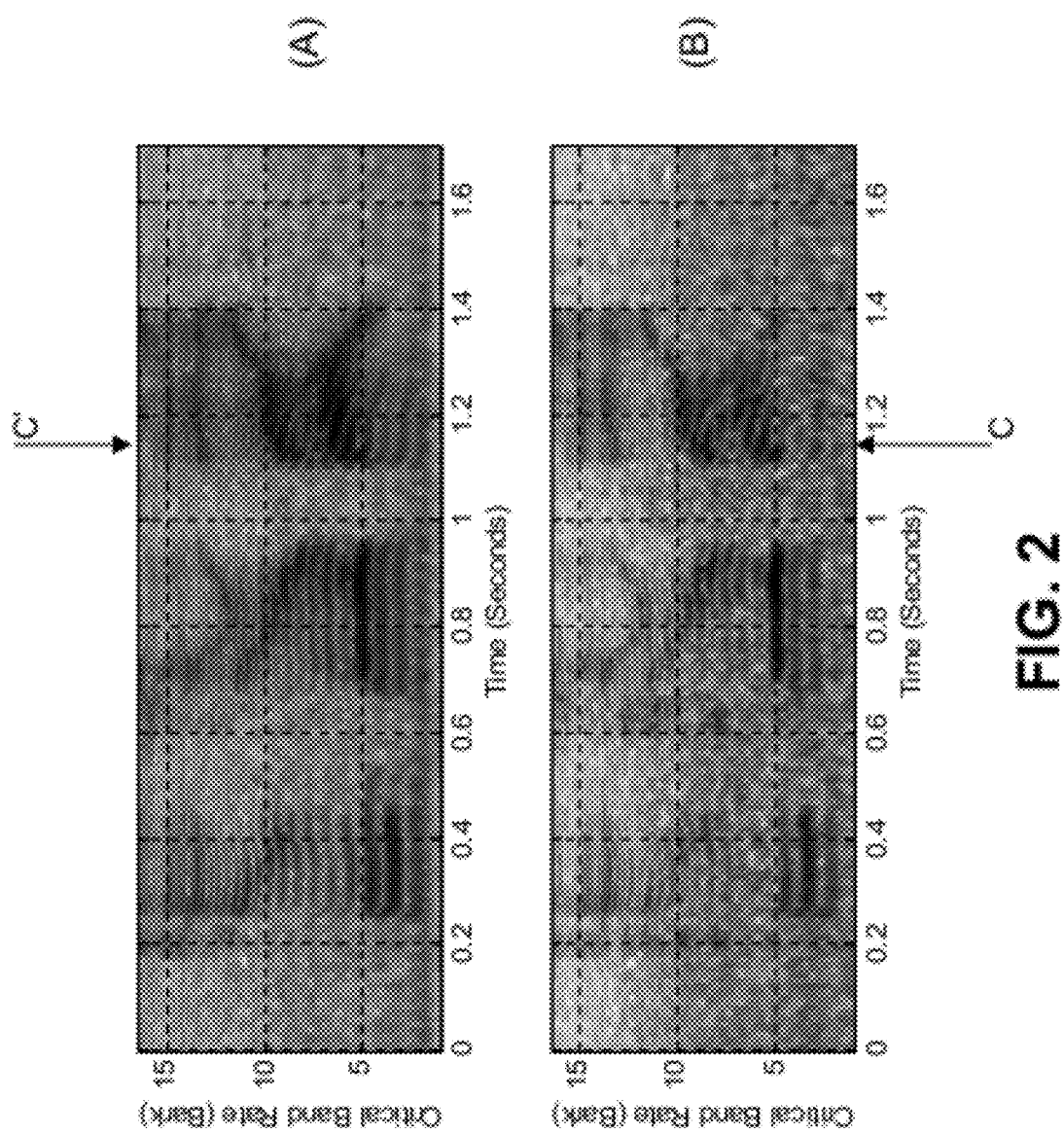
FIGS. 2(A)-(B) show the corresponding spectrograms of the speech signals as shown in FIGS. 1A-1B using FFT and displayed in Bark scales from 0 to 6.4 Barks (0 to 3500 KHz).
Figure 3:
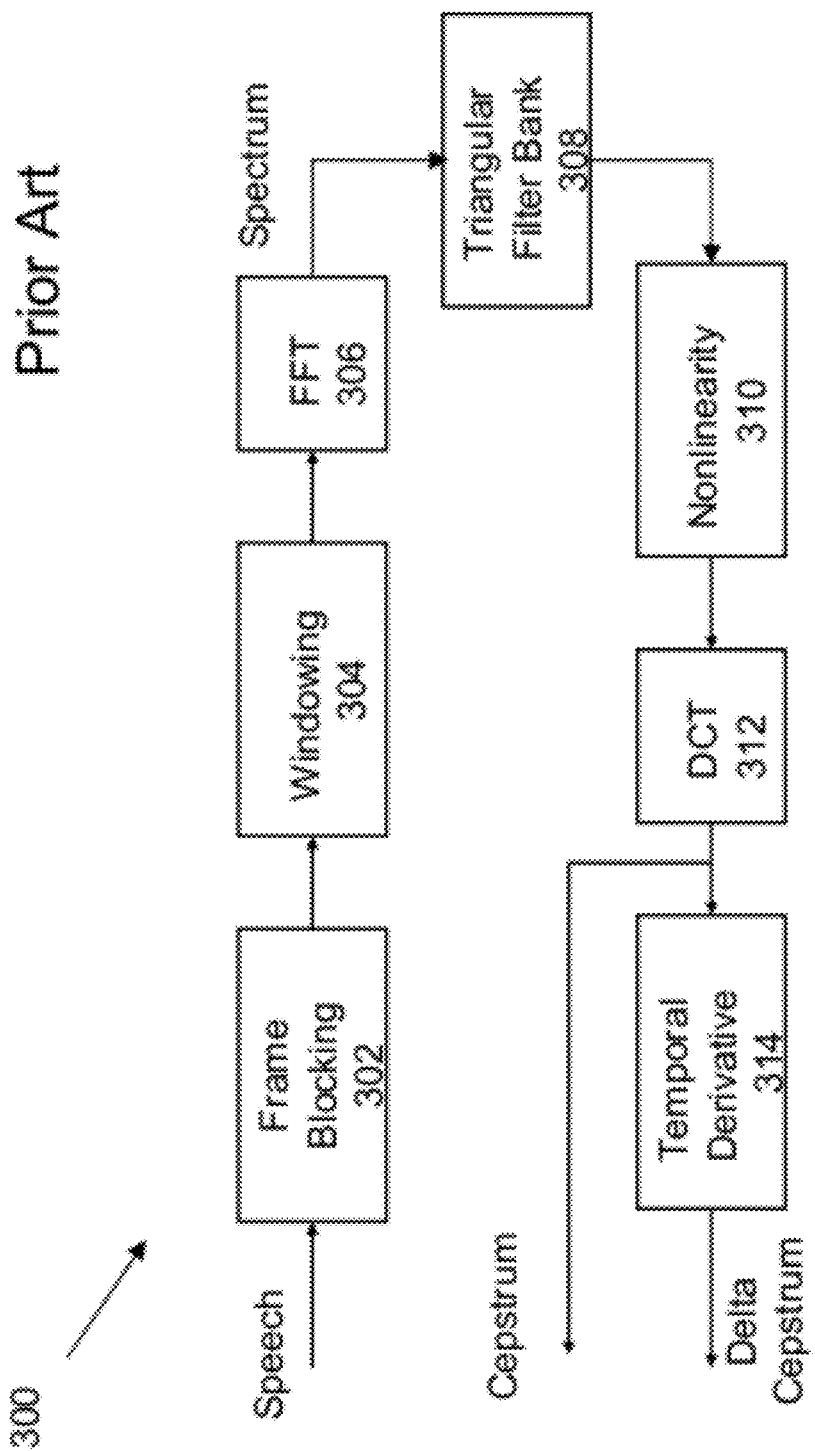
FIG. 3 shows a conventional Fourier transform based speech signal processing system for extracting speech features.
Figure 4:
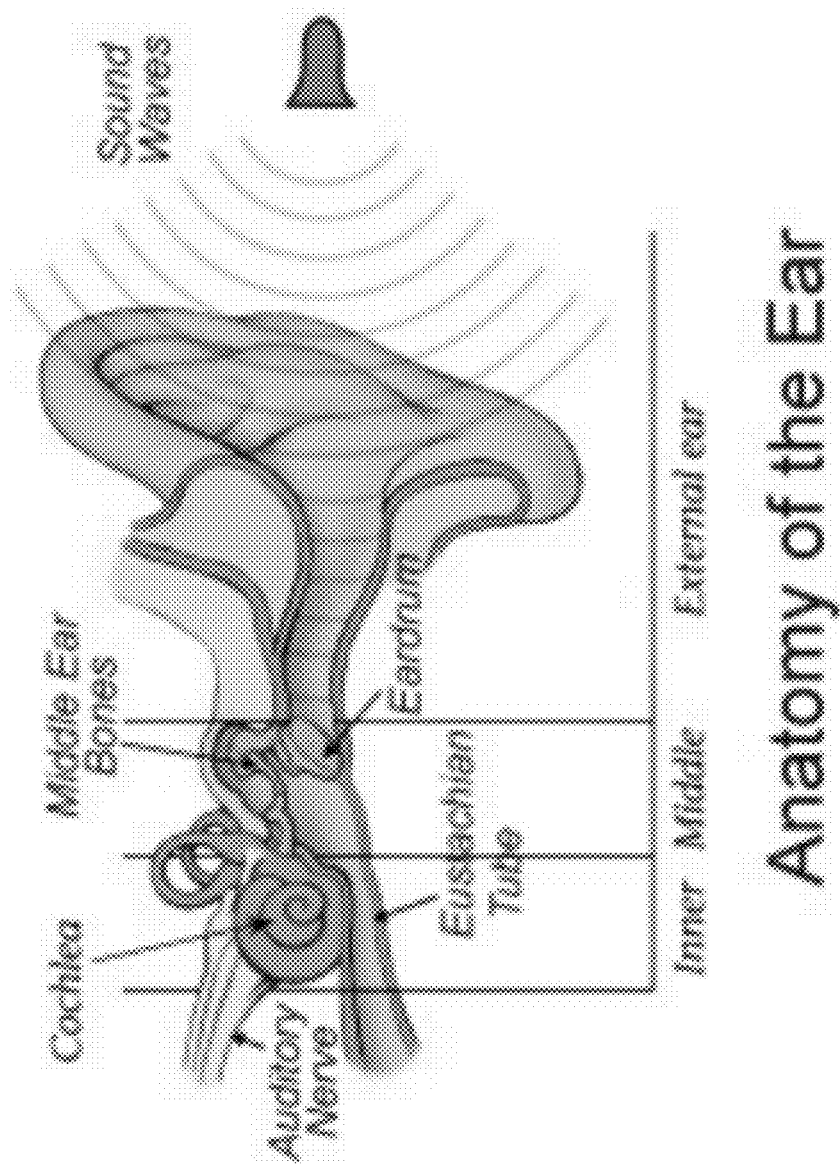
FIG. 4 shows an illustration of components of a human ear.
Figure 5:
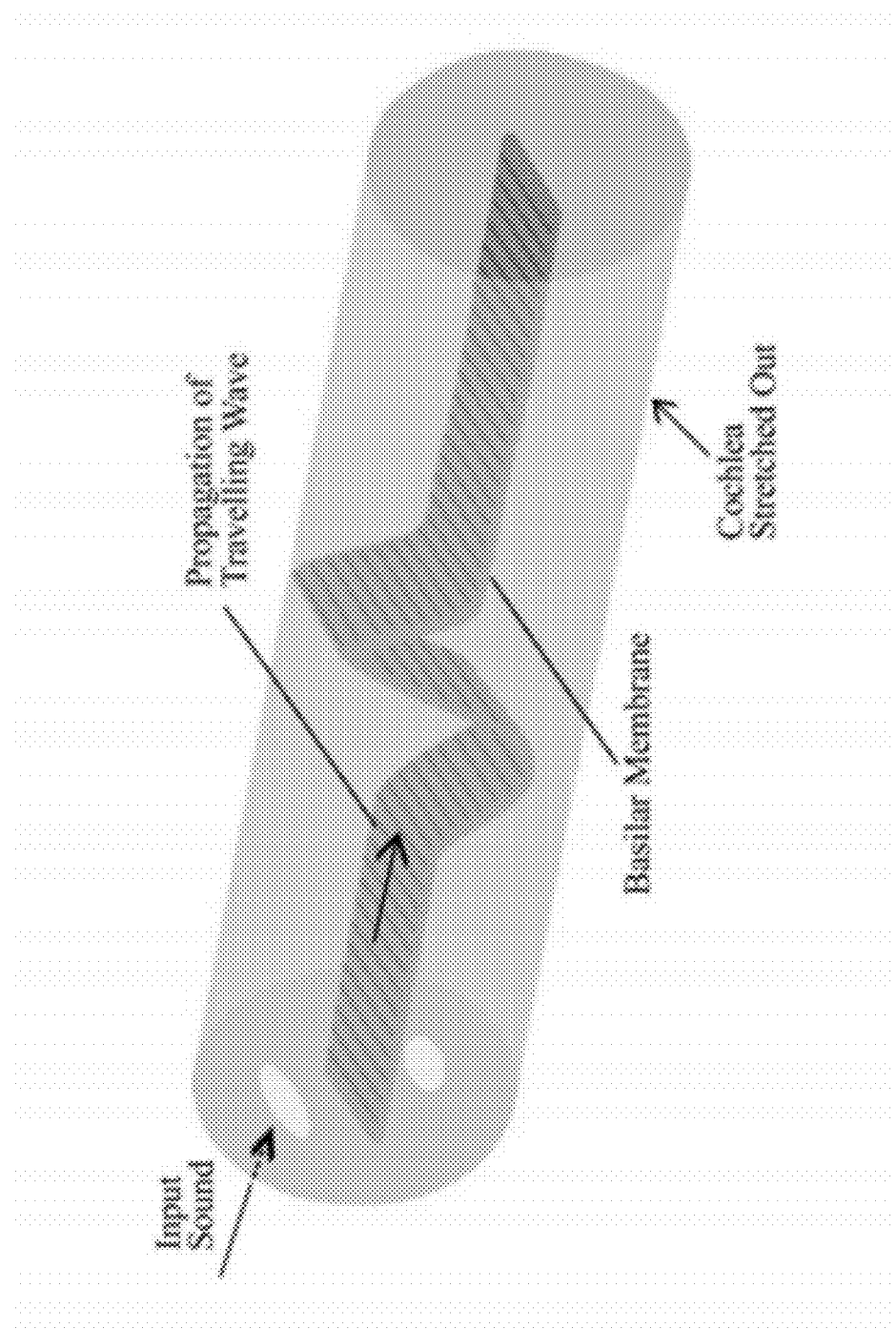
FIG. 5 shows a stretched-out cochlea and the cross-section of the basilar membrane inside the cochlea with a traveling wave along a propagation direction.
Figure 11:
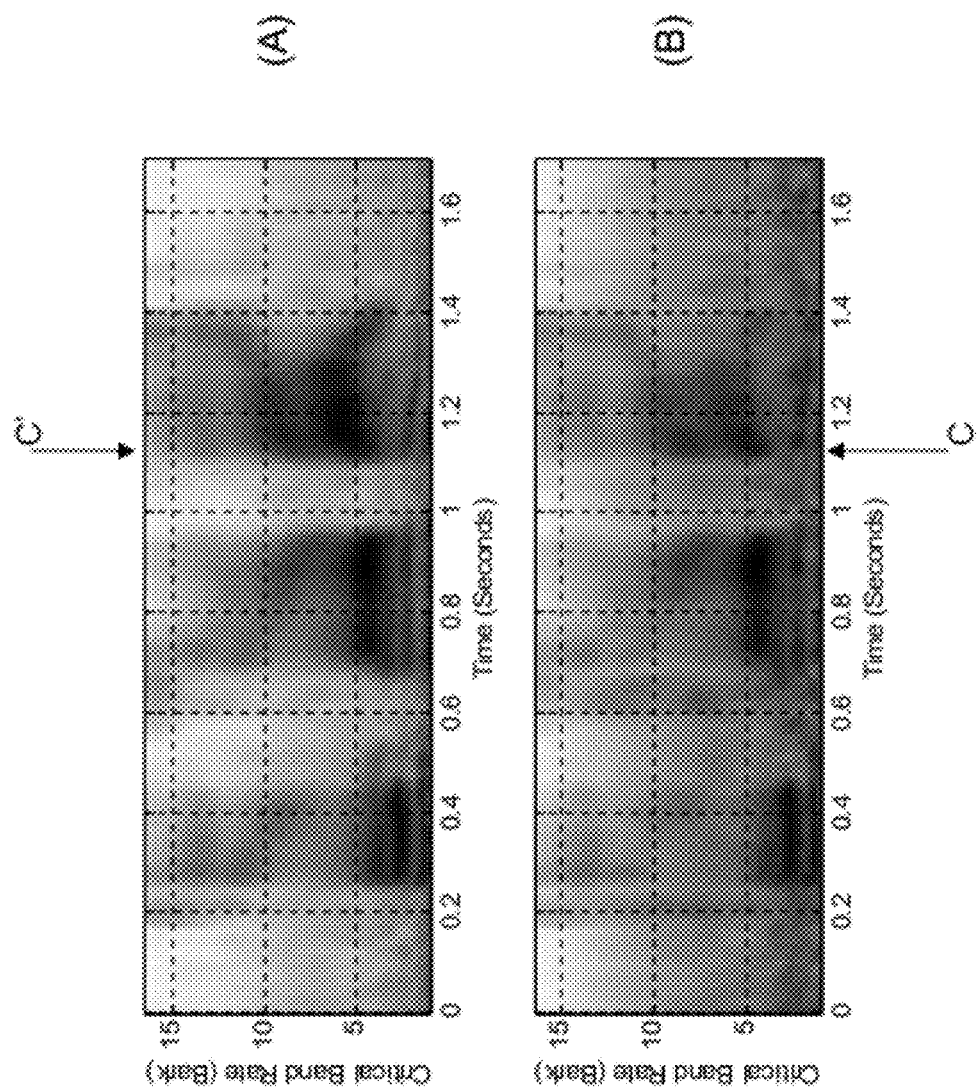
FIGS. 11(A)-(B) show the corresponding spectrograms of the speech signals as shown in FIGS. 1A-1B using the CT and displayed in Bark scales from 0 to 6.4 Barks (0 to 3500 KHz).
Figure 12:
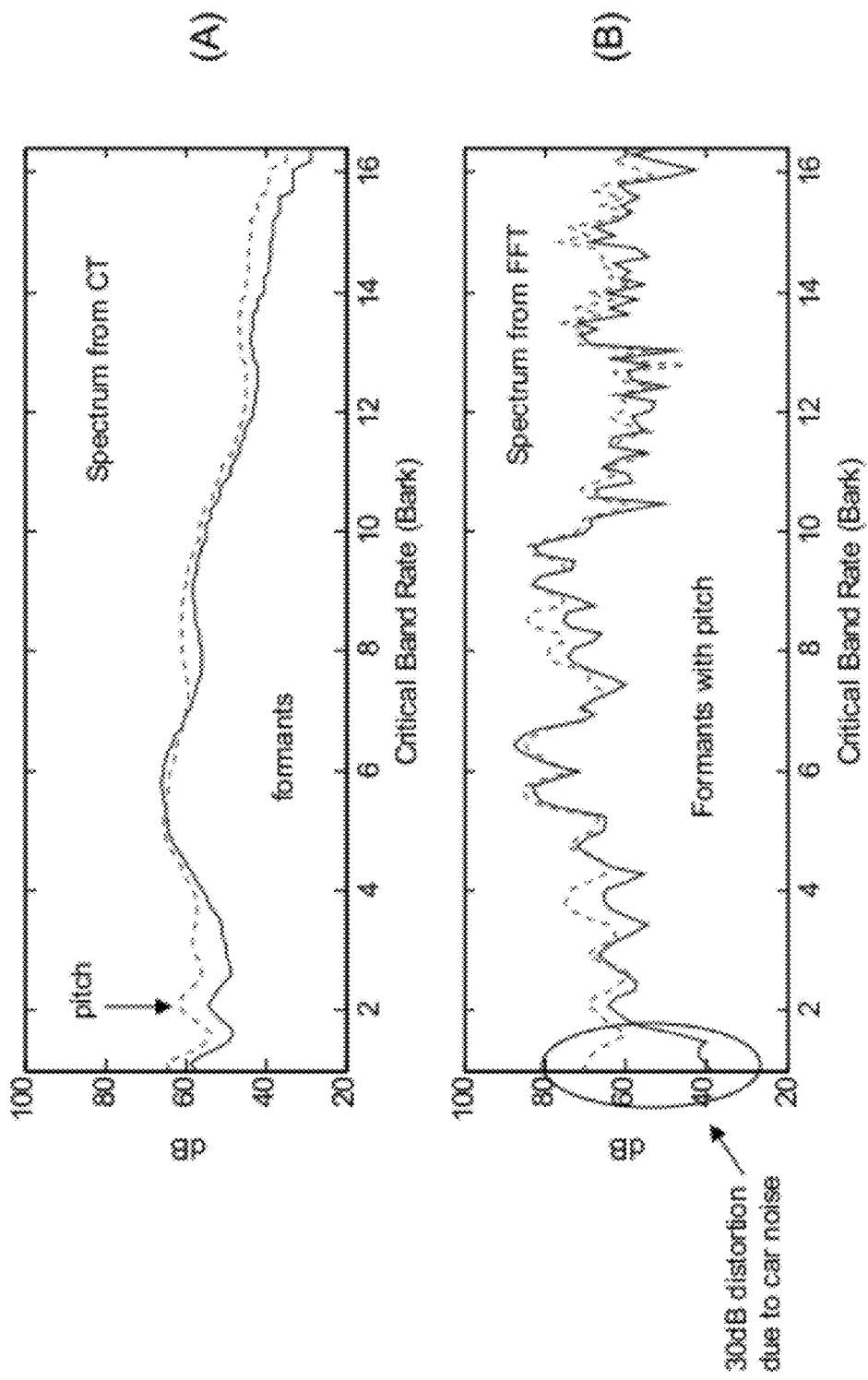
FIG. 12(A) shows a spectrum at time 1.15 second of the spectrograms (CC' cross-section) shown in FIGS. 11(A)-(B) with the solid line corresponding to the close-talking microphone recording and the dashed-line corresponding to the hands-free microphone recording.
FIG. 12(B) shows a spectrum at time 1.15 second of the spectrograms (CC' cross-section) shown in FIGS. 2(A)-(B) with the solid line corresponding to the close-talking microphone recording and the dashed-line corresponding to the hands-free microphone recording.

Experimental results show that the CT-based signal processing approach produce superior results compared to FFT-based approaches. FIGS. 11(A)-(B) show the corresponding spectrograms of the speech signals as shown in FIGS. 1A-1B using CT and displayed in Bark scales from 0 to 16.4 Barks (0 to 3500 KHz). Compared to the spectrograms produced using FFT as shown in FIGS. 2(A)-(B), the CT spectrograms have significantly less noise caused by FFT computations and almost no pitch harmonics. FIG. 12(A) shows a CT spectrum at time 1.15 second of the spectrograms (CC' cross-section) shown in FIGS. 11(A)-(B) with the solid line corresponding to the close-talking microphone recording and the dashed-line corresponding to the hands-free microphone recording. FIG. 12(B) shows an FFT spectrum at time 1.15 second of the spectrograms (CC' cross-section) shown in FIGS. 2(A)-(B)

with the solid line corresponding to the close-talking microphone recording and the dashed-line corresponding to the hands-free microphone recording. Compared with the FFT spectrum shown in FIG. 12(B), first the CT spectrum shown in FIG. 12(A) contains much less pitch harmonic distortions. The pitch harmonics in the FFT spectrum, as shown in FIG. 12(B), are artificial noises caused by the computation via FFT. The processing based on CT may avoid the drawbacks of FFT by emulating the behavior of basilar membrane in a human hearing system. Second, FIG. 12(B) shows a substantial distortion of approximately 30 dB on the FFT spectrum at the far left side due to car noise. By comparison, the difference is much smaller for CT spectrum. This improvement may provide the potential to develop new features for speech and speaker recognition. Last, the FFT spectrum may not be used as the feature for speaker recognition directly and may require triangular filters and discrete cosine transform to further remove the effect of the pitch harmonics. As a result, the important pitch information and the pitch harmonics may be removed altogether. This is one of the reasons that pitch information has yet to be used in speaker recognition.

A non-transitory machine-readable storage media having stored thereon instructions adapted to be executed by a processor to perform a method for processing signals representing a speech via multiple filters that approximate behaviors of human cochlea is provided. A first signal representing speech is provided to the multiple filters. The first signal is filtered with the multiple filters. Each of the multiple filters is formed from a base function via a dilation and a shift in time. An impulse response of the base function at a particular frequency band is similar to an impulse response of the basilar membrane at a corresponding frequency band inside the human cochlea.

A system for processing signals representing a speech via multiple filters that approximate behaviors of human cochlea is provided. The system comprises multiple filters, and a processor. The processor is configured to provide a first signal representing speech to the multiple filters. The processor is further configured to filter the first signal with the multiple filters. Each of the plurality of filters produces one of multiple filtered signals. Each of the multiple filters is formed from a base function via a dilation and a shift in time. An impulse response of the base function at a particular frequency band is similar to an impulse response of the basilar membrane at a corresponding frequency band inside the human cochlea.

Those skilled in the art may appreciate from the foregoing description that the present invention may be implemented in a variety of forms, and that the various embodiments may be implemented alone or in combination, in hardware or software, and in analogue or digital circuits. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for processing signals representing speech or audio via a plurality of filters that approximate behaviors of basilar membrane in human cochlea, comprising:
providing a processor configured to:
providing a first signal representing said speech or said audio to the plurality of filters, wherein said first signal is a digital signal; and
filtering the first signal with the plurality of filters, each of the plurality of filters producing one of a plurality of filtered signals;

wherein
each of the plurality of filters is formed from a base function via a dilation and a shift in time, wherein the base function is a digital filter representing an impulse response at a point on the basilar membrane to a corresponding frequency and the each of the plurality of filters is a digital filter formed from the base function via a dilation and a shift in time;
wherein the first signal is filtered according to:

$$T[a_i, b] = \sum_{n=0}^{N} f[n] \frac{1}{\sqrt{|a_i|}} \psi\left[\frac{n-b}{a_i}\right],$$

and wherein for the shift of b and a dilation of $a_i$, the each of the plurality of digital filters is determined according to:

$$\psi_{a_i,b}(n) = \frac{1}{\sqrt{|a_i|}} \left(\frac{n-b}{a_i}\right)^\alpha \exp\left[-2\pi f_L \beta\left(\frac{n-b}{a}\right)\right] \cos\left[2\pi f_L\left(\frac{n-b}{a_i}\right) + \theta\right] u(n),$$

wherein n=1, . . . , N, are discrete time instances, u(n) is a step function, and $\alpha$, $\beta$, $\theta$, and $f_L$ are constants;
and wherein the impulse response of the base function at a particular frequency band is similar to an impulse response of the basilar membrane at a corresponding frequency band in the human cochlea when:
value of $\alpha$>0,
value of $\beta$>0,
value of $\theta$ is selected to equate $$\int_{-\infty}^{\infty} \psi_{ai,b}(n)dn = 0,$$

u(n) =1 for n >=0, and
a>0, b>=0, $f_L$>0.

2. The method of claim 1, wherein each of the plurality of digital filters has a frequency response to which a central frequency is associated.

3. The method of claim 2, wherein central frequencies to the plurality of digital filters are distributed according to one of a Bark scale, an equivalent rectangular bandwidth (ERB) scale, and a log scale.

4. The method of claim 1, wherein the $\alpha$ is in a range of 1 to 4 and the $\beta$ is in a range of 0.01 to 0.5.

5. The method of claim 1, wherein the $\alpha$ is approximately equal to a value of 3 and the $\beta$ is approximately equal to a value of 0.035.

6. The method of claim 1, further comprising:
processing the plurality of the filtered signals according a set of pre-determined rules to produce a plurality of processed signals; and
synthesizing a second speech signal based on a summation of products of each of the processed the plurality of the filtered signals and each of the plurality of filters.

7. The method of claim 6, wherein the processing includes at least one of a reduction of noise in the speech or audio, a change of magnitude of the digital signal, and a change of number of times frames in the digital signal at an output of a cochlear transformation (CT).

8. The method of claim 6, wherein the synthesizing the second speech signal is based on:

$$\bar{f}[n] = \frac{1}{C} \sum_{a_i=a_1}^{a_k} \sum_{b=1}^{N} \frac{1}{|a_i|} T[a_i, b] \psi\left[\frac{n-b}{a_i}\right]$$

wherein $0 \leq n \leq N$, $a_1 \leq a_i \leq a_k$, and $1 \leq b \leq N$, $T[a_i, b]$ represents the plurality of the filtered signals with the shift of b and a dilation of $a_i$, and $$\psi\left[\frac{n-b}{a_i}\right].$$

9. The method of claim 1, further comprising:
extracting at least one feature from the filtered signal for a speech recognition application.

10. The method of claim 9, wherein the at least one feature includes CT cepstral coefficients.

11. The method of claim 1, wherein the each of the plurality of filters is made from analog components.

12. The method of claim 1, wherein the $\alpha$ is approximately equal to a value of 3 and the $\beta$ is approximately equal to a value of 0.15.

13. A non-transitory machine-readable storage media having stored thereon instructions adapted to be executed by a processor to perform a method for processing signals representing speech or audio via a plurality of filters that approximate behaviors of human cochlea comprising:
providing a first signal representing speech to the plurality of filters, wherein said first signal is a digital signal;
filtering the first signal with the plurality of filters, each of the plurality of filters producing one of a plurality of filtered signals;
wherein
each of the plurality of filters is formed from a base function via a dilation and a shift in time, wherein the base function is a digital filter representing an impulse response at a point on the basilar membrane to a corresponding frequency and the each of the plurality of filters is a digital filter formed from the base function via a dilation and a shift in time;
wherein the signal is filtered according to:

$$T[a_i, b] = \sum_{n=0}^{N} f[n] \frac{1}{\sqrt{|a_i|}} \psi\left[\frac{n-b}{a_i}\right],$$

and wherein for the shift of b and a dilation of the each of the plurality of digital filters is determined according to:

$$\psi_{a_i,b}(n) = \frac{1}{\sqrt{|a_i|}} \left(\frac{n-b}{a_i}\right)^\alpha \exp\left[-2\pi f_L \beta\left(\frac{n-b}{a}\right)\right] \cos\left[2\pi f_L\left(\frac{n-b}{a_i}\right) + \theta\right] u(n),$$

wherein n=1, ..., N, are discrete time instances, u(n) is a step function, and $\alpha$, $\beta$, $\theta$, and $f_L$ are constants;
and wherein the impulse response of the base function at a particular frequency band is similar to an impulse response of the basilar membrane at a corresponding frequency band in the human cochlea when:
value of $\alpha > 0$,
value of $\beta > 0$,
value of $\theta$ is selected to equate $$\int_{-\infty}^{\infty} \psi_{a_i,b}(n) \, dn = 0,$$

u(n)=1 for n>=0, and
a>0, b>=0, $f_L$>0.

14. A system for processing signals representing speech or audio via a plurality of filters that approximate behaviors of human cochlea, comprising:
a plurality of filters; and
a processor configured to:
providing a first signal representing speech to the plurality of filters, wherein said first signal is a digital signal;
filtering the first signal with the plurality of filters, each of the plurality of filters producing one of a plurality of filtered signals;
wherein
each of the plurality of filters is formed from a base function via a dilation and a shift in time, wherein the base function is a digital filter representing an impulse response at a point on the basilar membrane to a corresponding frequency and the each of the plurality of filters is a digital filter formed from the base function via a dilation and a shift in time;
wherein the signal is filtered according to:

$$T[a_i, b] = \sum_{n=0}^{N} f[n] \frac{1}{\sqrt{|a_i|}} \psi\left[\frac{n-b}{a_i}\right],$$

and wherein for the shift of b and a dilation of the each of the plurality of digital filters is determined according to:

$$\psi_{a_i,b}(n) = \frac{1}{\sqrt{|a_i|}} \left(\frac{n-b}{a_i}\right)^\alpha \exp\left[-2\pi f_L \beta\left(\frac{n-b}{a}\right)\right] \cos\left[2\pi f_L\left(\frac{n-b}{a_i}\right) + \theta\right] u(n),$$

wherein n=1, ..., N, are discrete time instances, u(n) is a step function, and $\alpha$, $\beta$, $\theta$, and $f_L$ are constants;
and wherein the impulse response of the base function at a particular frequency band is similar to an impulse response of the basilar membrane at a corresponding frequency band in the human cochlea when:
value of $\alpha > 0$,
value of $\beta > 0$,
value of $\theta$ is selected to equate $$\int_{-\infty}^{\infty} \psi_{a_i,b}(n) \, dn = 0,$$

u(n)=1 for n>=0, and
a>0, b>=0, $f_L$>0.

15. A method for processing signals representing speech or audio via a plurality of filters that approximate behaviors of basilar membrane in human cochlea, comprising:
providing a first signal representing said speech or said audio to the plurality of filters, wherein said first signal is an analog signal; and filtering the first signal with the plurality of filters, each of the plurality of filters producing one of a plurality of filtered signals;

wherein
each of the plurality of filters is formed from a base function via a dilation and a shift in time, wherein the base function is an analog filter representing an impulse response at a point on the basilar membrane to a corresponding frequency and the each of the plurality of filters is an analog filter formed from the base function via a dilation and a shift in time;

wherein the first signal is filtered according to:

$$T(a, b) = \int_{-\infty}^{\infty} f(t) \frac{1}{\sqrt{|a|}} \psi\left(\frac{t-b}{a}\right) dt$$

and wherein for the shift of b and a dilation of the each of the plurality of analog filters is determined according to:

$$\psi_{a,b}(t) = \frac{1}{\sqrt{|a|}} \left(\frac{t-b}{a}\right)^\alpha \exp\left[-2\pi f_L \beta\left(\frac{t-b}{a}\right)\right] \cos\left[2\pi f_L\left(\frac{t-b}{a}\right) + \theta\right] u(t)$$

wherein n=1, ..., N, are discrete time instances, u(n) is a step function, and $\alpha$, $\beta$, $\theta$, and $f$ are constants;

and wherein the impulse response of the base function at a particular frequency band is similar to an impulse response of the basilar membrane at a corresponding frequency band in the human cochlea when:
value of $\alpha > 0$,
value of $\beta > 0$,
value of $\theta$ is selected to equate $$\int_{-\infty}^{\infty} \psi_{ai,b}(n) dn = 0,$$

u(n) =1 for n >=0, and
a >0, b >=, 0, $f_L$ >0.

16. The method of claim 15, wherein an inverse cochlear transform transforms T [a, b] to time domain according to:

$$f(t) = \frac{1}{C} \int_{a=0}^{\infty} \int_{b=0}^{\infty} \frac{1}{|a|^2} T(a, b) \psi_{a,b}(t) da db.$$

17. The method of claim 15, wherein:
the base function is an analog filter denoting a continuous waveform, and
the each of the plurality of filters is an analog filter formed from the base function via a dilation and shift in time.

\* \* \* \* \*